(12) United States Patent
Shailendra et al.

(10) Patent No.: US 10,291,474 B2
(45) Date of Patent: May 14, 2019

(54) METHOD AND SYSTEM FOR DISTRIBUTED OPTIMAL CACHING OF CONTENT OVER A NETWORK

(71) Applicant: Tata Consultancy Services Limited, Mumbai (IN)

(72) Inventors: Samar Shailendra, Bangalore (IN); Bighnaraj Panigrahi, Bangalore (IN); Senthilmurugan Sengottuvelan, Bangalore (IN); Hemant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 148 days.

(21) Appl. No.: 15/357,241

(22) Filed: Nov. 21, 2016

(65) Prior Publication Data

US 2017/0207974 A1 Jul. 20, 2017

(30) Foreign Application Priority Data

Jan. 15, 2016 (IN) .............................. 201621001598

(51) Int. Cl.
*H04L 12/24* (2006.01)
*H04L 29/08* (2006.01)
(Continued)

(52) U.S. Cl.
CPC .......... *H04L 41/0893* (2013.01); *H04L 41/04* (2013.01); *H04L 45/122* (2013.01);
(Continued)

(58) Field of Classification Search
None
See application file for complete search history.

(56) References Cited

U.S. PATENT DOCUMENTS

| 8,667,172 B2 | 3/2014 | Ravindran et al. |
| 8,732,309 B1 | 5/2014 | Richardson et al. |
(Continued)

OTHER PUBLICATIONS

Panigraphi, Bighnaraj, et al; Universal Caching Model and Markov-based Cache Analysis for Information Centric Networks; 2014 IEEE International Conference on Advanced Networks and Telecommunications Systems, Dec. 2014.*
(Continued)

*Primary Examiner* — Kent K Krueger
(74) *Attorney, Agent, or Firm* — Finnegan, Henderson, Farabow, Garrett & Dunner LLP

(57) ABSTRACT

A method and system is provided for distributed optimal caching for information centric networking. The system and method disclosed herein enables each router/node in the network to make an independent decision to solve the optimization problem based upon a cost feedback from its neighbors. Content is received by a first router which determines if it should store the content in its cache based on a Characterizing Metrics (CM) value or send it to a neighbor router j, where the neighbor router j is selected based on a transaction cost determination. The node j on receiving the content shared with itself again performs similar computation to determine if the content should be stored in its cache. The method is performed iteratively for optimal distributed caching.

11 Claims, 9 Drawing Sheets

(51) Int. Cl.
*H04L 12/733* (2013.01)
*H04L 12/721* (2013.01)

(52) U.S. Cl.
CPC ............ *H04L 45/124* (2013.01); *H04L 45/44* (2013.01); *H04L 67/1097* (2013.01); *H04L 67/2842* (2013.01)

(56) References Cited

U.S. PATENT DOCUMENTS

2011/0271007 A1\* 11/2011 Wang .................... H04L 45/306
709/238
2015/0163127 A1 6/2015 Garcia-Luna-Aceves

OTHER PUBLICATIONS

Eum, S. et al., "CATT: Potential Based Routing with Content Caching for ICN", Proceeding ICN '12 Proceedings of the Second edition of the ICN workshop on Information-centric networking, ACM, pp. 49-54, 2012.

\* cited by examiner

METHOD AND SYSTEM FOR DISTRIBUTED OPTIMAL CACHING OF CONTENT OVER A NETWORK

PRIORITY CLAIM

This U.S. patent application claims priority under 35 U.S.C. § 119 to: India Application No. 201621001598, filed on Jan. 15, 2016. The entire contents of the aforementioned application are incorporated herein by reference.

TECHNICAL FIELD

This disclosure relates generally to caching of data, and more particularly to a method and system for distributed optimal caching of data over a network.

BACKGROUND

In any network, caching plays an important role. If the available content in the network were small, every node/router in the network could have stored all the content and this would have led to the best possible performance.

It is not possible to store all the content on every node/router. Hence, the nodes/routers must store only those contents which help these devices to serve the requests arriving from the users directly connected to them i.e., improving the local cache hits.

However, such an approach of maximizing local cache hits does not necessarily lead to an optimal performance of the network i.e., maximizing of total cache hits in the network. Hence, a collaborative approach with neighbors for cache sharing may lead to a better resource utilization and system performance.

Although various network architectures proposed in the literature for Information Centric Networking (ICN) are different from each other in their operations, they all address at least two primary challenges of ICN a) Naming: naming schemes should be efficient as well as scalable to handle massive growth of contents/data. b) Caching: in ICN routers are enabled to cache the contents passing through them. Due to limited available storage memory, it is not possible to store all the contents in the caches of these routers. Hence these caches need to replace content using various stand-alone caching policies. Existing standalone policies which are in use include Least Recently Used (LRU), Least Frequently Used (LFU), and Universal Caching (UC) etc.

Further, most of the existing standalone ICN caching schemes focus on individual cache routers where each router intends to maximize its cache usage by storing high demand content. Many a times some of the router caches may be underutilized by storing relatively low demand contents while other routers may get over utilized and may be forced to drop high demand content.

The existing standalone caching policies have characterizing metrics based on which caching of the new content and content replacement is performed. For Example Characterizing Metric (CM) ensures that the cache hit for a router is maximized, however this does not ensure that the overall cache hit of the system is maximized. There may be routers in the network which are not very frequently accessed and hence may offer better opportunities for data to be cached in their respective caches. The prior art does not focus on the problem of optimized cache utilization in a network architecture giving consideration to overall network utility and the same is a challenge in the technical domain.

SUMMARY

Embodiments of the present disclosure present technological improvements as solutions to one or more of the above-mentioned technical problems recognized by the inventors in conventional systems. For example, in one embodiment, a method for distributed optimal caching of data in a network architecture is provided. The method comprises processor implemented steps of, receiving a data from a source (116) at a first router, wherein a caching policy is implemented on the first router. The method further comprises computing a first characterizing metrics (CM) value for the received data using the caching policy, wherein the first CM value is used to determine whether the data can be stored in the cache of the first router. Further the method comprises, storing the received data in a cache of the first router when first CM value is higher than a CM value of a previously cached data stored in the cache of the first router. In another embodiment the method comprises storing the received data in the cache of a neighbor router when the first CM value is less than a CM value of previously cached data stored in the cache of the first router wherein storing the received data in the cache of the neighbor router comprises selecting from a plurality of neighbor routers, the neighbor router with a least transaction cost, computing a second CM value for the received data to be stored at the neighbor router using the caching policy, wherein the second CM value is used to determine whether the data can be stored at the neighbor router and storing the received data at the cache of the neighbor router when the second CM value is less than a CM value of the data previously stored in the cache of the neighbor router.

In another embodiment, a system for optimal caching of data in a network architecture is provided. The system comprising at least one source (116) and a plurality of clusters wherein the plurality of clusters comprise a plurality of caching devices communicatively coupled with each other. In an embodiment the plurality of caching devices are adapted for: receiving a data from a source (116) at a first router of the plurality of routers, wherein a caching policy is implemented on the first router; computing a first Characterizing metrics (CM) value for the received data using the caching policy, wherein the first CM value is used to determine whether the data can be stored in the cache of the first router. In an embodiment storing the data in a cache of the first router when first CM value of the data is higher than a CM value of a previously cached data stored in the cache of the first router. In another embodiment storing the data hi the cache of a neighbor router when the first CM value is less than a CM value of previously cached data stored in the cache of the first router, wherein storing the data in the cache of the neighbor router comprises selecting from a plurality of neighbor routers, the neighbor router with a least transaction cost, computing a second CM value for the data to be stored at the neighbor router using the caching policy, wherein the second CM value is used to determine whether the data can be stored at the neighbor router, and storing the data at the cache of the neighbor router when the second CM value is less than a CM value of the data previously stored in the cache of the neighbor router.

In yet another embodiment, the instant application provides a non-transitory computer readable medium comprising thereon instruction which when executed by a possessor on a system, cause the processor to perform a method comprising, receiving a data from a source (116) at a first router, wherein a caching policy is implemented on the first router. The method further comprises computing a first characterizing metrics (CM) value for the received data using the caching policy, wherein the first CM value is used to determine whether the data can be stored in the cache of the first router. Further the method comprises, storing the received data in a cache of the first router when first CM value is higher than a CM value of a previously cached data stored in the cache of the first router. In another embodiment the method comprises storing the received data in the cache of a neighbor router when the first CM value is less than a CM value of previously cached data stored in the cache of the first router wherein storing the received data in the cache of the neighbor router comprises selecting from a plurality of neighbor routers, the neighbor router with a least transaction cost, computing a second CM value for the received data to be stored at the neighbor router using the caching policy, wherein the second CM value is used to determine whether the data can be stored at the neighbor router and storing the received data at the cache of the neighbor router when the second CM value is less than a CM value of the data previously stored in the cache of the neighbor router.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

This application uses the words node(s) and routers interchangeably, however both the words are words are used to denote devices where caching can be performed. Further the application also uses the words data and content interchangeable, however these words are used to denote the data that may be received from a source where source contains of the data/content.

The subject matter disclosed herein implements distributed caching in any network architecture which can be applied universally to various network and usage scenarios. In an aspect of the system, the caching nodes/routers in the network collaborate with each other such that network utilities such as probability of cache hit or latency or the amount of data being downloaded from the server is optimized. In another embodiment, distributed caching stores more popular content in the network as well as increase the diversity of the content in the network at the cost of increased state communication between the nodes/routers to improve network utilization. In another aspect, the present application further discloses calculating how much data may be shared by each node with a neighbor node/router so that the overall system utility is optimized.

Figure 1:
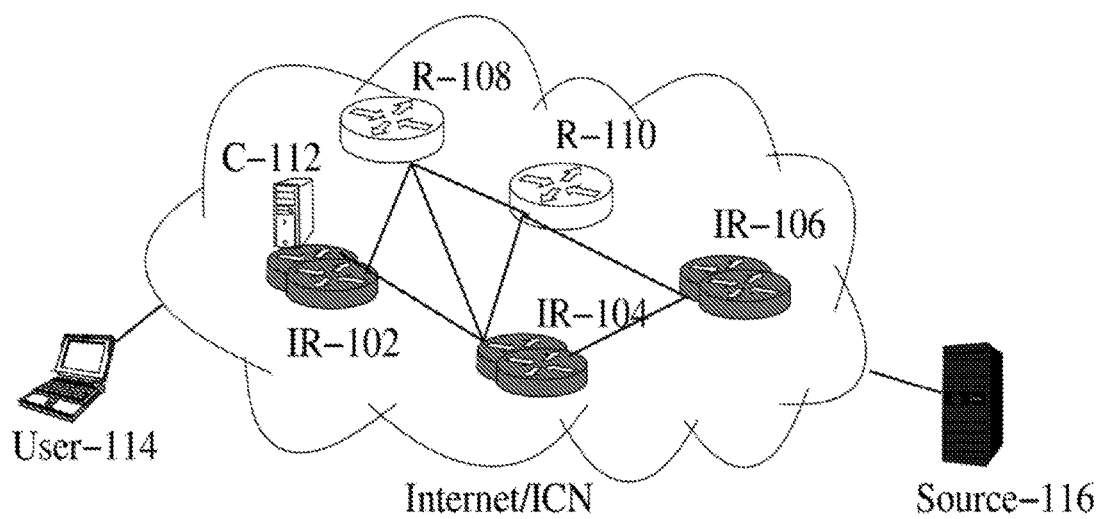
FIG. 1 illustrates an exemplary system architecture for distributed optimal caching of content over a network according to some embodiments of the present disclosure.

In an embodiment referring to FIG. 1 system architecture for distributed optimal caching of content over a network architecture is illustrated. The system for distributed optimal caching comprises of network devices including ICN capable devices, ICN Router (IR-102, IR-104, and IR-106); Content Caches (C-112); and non ICN/legacy Routers, Gateways, and Name Resolvers (R-108, and R-110), a user (114) and a source (116) of a plurality of content. In one aspect the proposed system for optimal caching of content may be utilized in an Information Centric Networks (ICN) may be part of the ICN router functionalities. The ICN Routers (IR-102, IR-104, and IR-106) may be any of the Internet router with extra cache (C-112) and ICN specific interfaces.

In an embodiment the system may comprise of a plurality of such clusters, wherein each cluster comprises a plurality of routers, identified based on a traffic characteristics and a density of router deployment. A first router, out of the plurality of routers receives data from a source (116) wherein each router has a predefined caching policy for each of the routers. In an embodiment the source may be a server or an ICN router and the data received may be ICN chunk. When a first router receives the data from the source (116), the first router computes a first Characterizing Metrics (CM) value for the received data using the caching policy. In an exemplary embodiment Universal Caching (UC) policy may be implemented on each node/router of the cluster. This first CM value is used to determine whether the received data can be stored in the cache of the first router. According to an aspect of the subject matter disclosed herein, when the first CM value of the received data is higher than a CM value of a previously cached data in the cache of the first router, the received data is stored in the cache of the first router, wherein higher CM value implies that the importance of the data with higher CM value is more.

In an embodiment where Universal Caching (UC) is employed, the previously cached data is replaced by the received data in the cached of the first router. If the first CM value is less than the CM value of previously cached data stored in the cache of the first router, the received data is stored in the cache of a neighbor router wherein storing the data in the cache of the neighbor router comprises, selecting from a plurality of neighbor routers, the neighbor router with a least transaction cost. In another aspect if the router is unable to store the data, it will forward this data to its neighbors using the same approach as above wherein the data may not be returned to the first router. In another embodiment the above step may be performed iteratively based on a predefined parameter decided by a user where in one aspect the user may be the system designer/the operator or like. In an embodiment, the parameter may be a Time to Live (TTL) parameter of a data packet.

In an embodiment the transaction cost may be determined such that when a first router wishes to share $q_n$ amount of data with the neighbor router, the router has to pay a cost $p_j$, hence the total cost for sharing $q_n$ is $(p_j \times q_n)$ wherein $p_j$ is a function of importance of the data cached at a router and the cache filling rate.

In one embodiment the process of storing the received data in the neighbor router further comprises step of computing a second CM value for the data to be stored in the cache of the neighbor router using the caching policy, and then storing the data at the cache of the neighbor router when the second CM value is less than a CM value of the data previously stored in the cache of the neighbor router.

In an embodiment of the subject matter disclosed herein the caching policy is Universal Caching (UC) policy and the ICN architecture is O-ICN architecture. In another aspect referring to FIG. 4 the system disclosed herein may be configured such that the first router and the neighbor router may update the cache list of the ICN manager (404A) such that the first router updates the cache list when the data is stored in the first router and the neighbor router updates the cache list when the data is stored in the neighbor router.

In another embodiment, the neighbor router may be configured to update the value of $p_j$ and communicating the updated value to all of the routers in the neighborhood of the neighbor router. The value of $p_j$ will in turn lead to updating of the transaction cost for sending data to the neighbor router.

Figure 2:
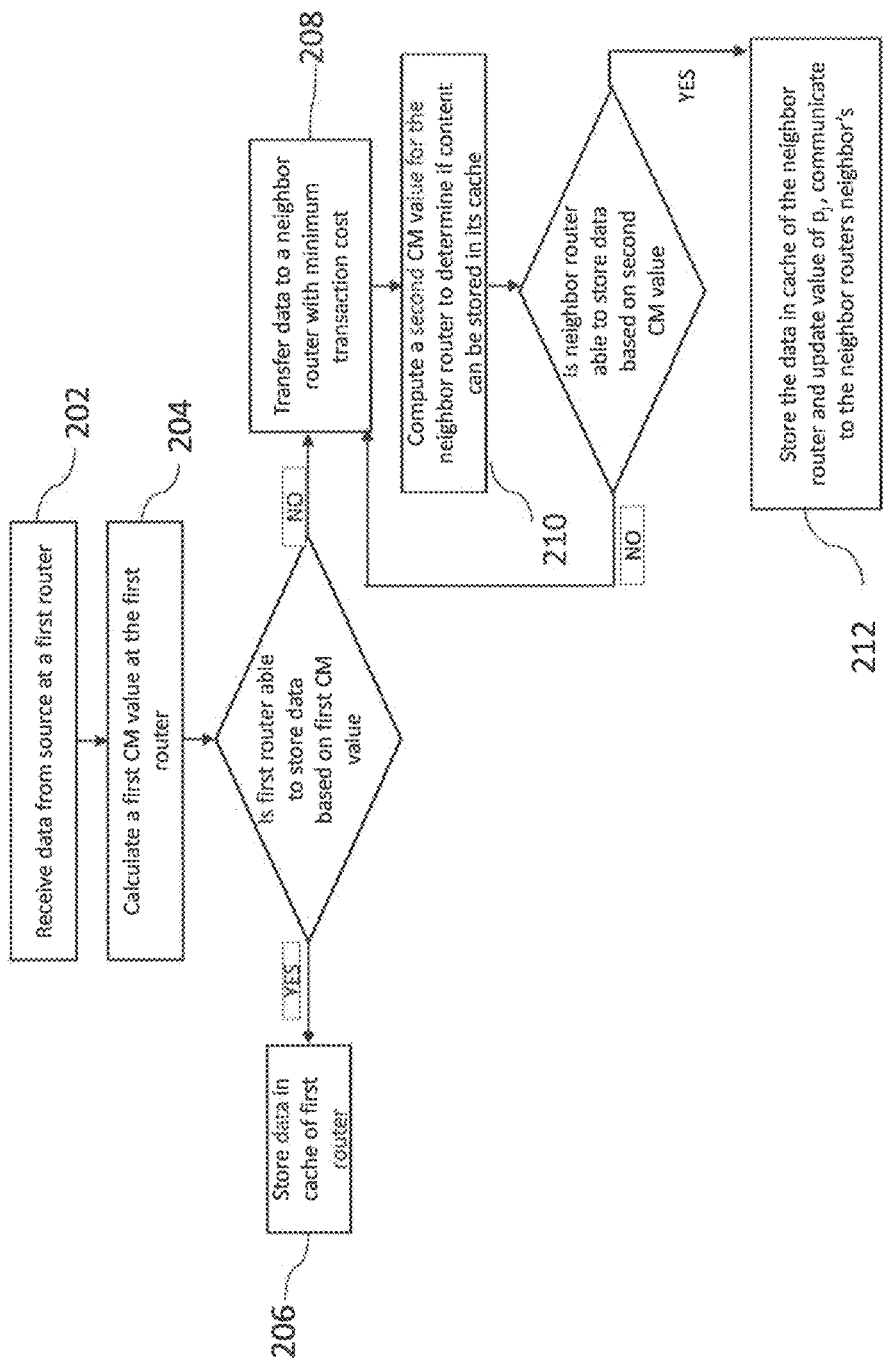
FIG. 2 shows a flowchart illustrating a method for distributed optimal caching of content over a network in accordance with an embodiment of the present disclosure.

Referring now to FIG. 2, a flowchart illustrating a method for distributed optimal caching for information centric networking in accordance with an embodiment of the present disclosure is shown. The process starts at step 202 where a data is received from a source by a first router out of a plurality of routers, wherein each router has defined caching policy. In an embodiment the source may be a server and the data received may be ICN chunk.

At step 204 when a first router receives the data from the source, the first router computes a first Characterizing Metrics (CM) value for the received data using a caching policy. The first CM value is used to determine if the data can be stored in the cache of the first router or not. If the first CM value for the data is greater than the CM value of the previously cached data stored in the cache of the first router then the received data may be stored in the cache of the first router as shown at step 206. In an embodiment where Universal Caching (UC) is employed, the previously cached data is replaced by the received data in the cached of the first router. However if the first CM value for the data is less than the CM value of the previously cached data stored in the cache of the first router then the data is transferred to a neighbor router selected out of a plurality of routers such that the transaction cost for data to be transferred from first router to the neighbor router is the least compared to other neighbor routers as illustrated at step 208. In an embodiment the transaction cost may be determined such that when a first router wishes to share dr, data with the neighbor router the router has to pay at a rate of $p_j$ and the total cost for sharing $q_n$ is $(p_j \times q_n)$ wherein $p_j$ is a function of importance of the data cached at a router and the cache filling rate.

At the step 210, a second CM value is computed for the neighbor router wherein the second CM value is used to determine if the received data can be stored in the cache of the neighbor router. According to an embodiment if the second CM value is greater than the CM value of the data stored in the cache of the neighbor router the received data may be stored in the cache of the neighbor router. In an embodiment if UC is employed the previously cached data may be replaced by the received data. In one embodiment, if the data cannot be stored at the neighbor router the process at step 208 is performed iteratively for each of the plurality of routers.

At the step 212 when the data is stored in the cache of the neighbor router the value of $p_j$ is updated and this value is communicated to each of the routers in the neighborhood of the neighbor router thereby changing the transaction cost for transferring data to the neighbor router.

In an embodiment where the data cannot be stored at the neighbor router due to no space in the cache of the neighbor router the neighbor router further shares the content with its other neighbors not including the first router. In an embodiment this is repeated for a predetermined number of times decided as per the implementation by a system designer or a system/network operator. The same is illustrated at the step 214. In one scenario the predetermined number of times may be based on Time to live of a data packet received from a source.

In another aspect the method may comprise, when a O-ICN architecture is used, updating the cache list of an ICN manager by the first router and the neighbor router such that the first router updates the cache list when the data is stored in the first router and the neighbor router updates the cache list when the data is stored in the neighbor router.

In an embodiment the method may be used for various caching problems comprising MANET, web caching and the like.

Figure 3:
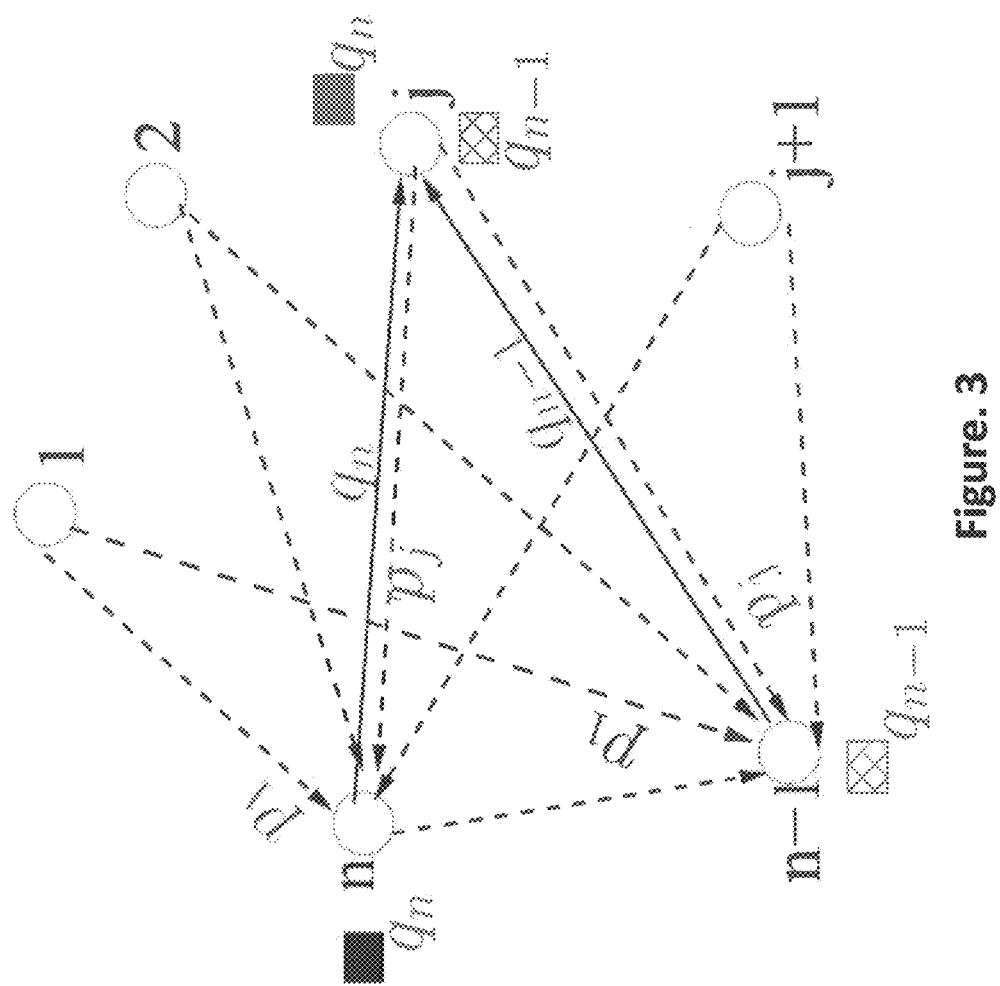
FIG. 3 illustrates an optimization model formulation in accordance with an embodiment of the present disclosure

Referring now to FIG. 3 an optimization model formulation where each node can share contents with other nodes as in the network. Each node receives content from the source. Based on its caching policy, a node decides whether to store the arriving content in its own cache or not, if it is not possible to store, then the node searches for other nodes in the vicinity where caching can be possible. Every node allocates a portion of its own cache (sharable cache) to store the content arriving from a neighboring node for sharing. The optimization model for the shared caching is formulated as explained in the following paragraphs.

In an embodiment $ch_j$ be the size of total cache at any node j, out of which let $c_j$ be the sharable cache, N be the total number of nodes present in one cluster and $q_n$ be the amount of content which node n is interested to share with others. Let $U_n(q_n)$ be the utility associated with this $q_n$, such that the utility function is strictly concave and double differentiable over $q_n$. Out of (N−1) available neighbors, n selects one node to share its contents.

In selecting a neighbor j (out of N−1 neighbors), node n would maximize its utility. In an embodiment where $p_j$ be the cost of sharing associated with node j, i.e., any node n wishes to share $q_n$ with neighbor j has to pay at a rate of $p_j$ and the total cost for sharing $q_n$ is ($p_j \times q_n$). Therefore, each node maximizes the individual utility and select the best neighbor such that its individual utility is maximized as per equation (1)

$$\arg\max_j \{U_n(q_n) - p_j \times q_n\}, \forall\ j. \quad (1)$$

In another embodiment H denotes the matrix comprising of the sharing information of all possible node pairs. The elements of H are expressed as per equation (2).

$$H_{nj} = \begin{cases} 1 & \text{if, node } n \text{ shares with node } j, \\ 0 & \text{otherwise.} \end{cases} \quad (2)$$

As $H_{nn}=0$, $\forall\ n$, therefore the total content shared with node j can be expressed as $\Sigma_{n=1:N, n \neq i} q_n H_{nj}$. Since at equilibrium, each source attempts to maximize its profit (individual optimality) by selecting node j with appropriate $p_j$, the individual optimality may be re-written as a global optimality equation (3)

$$\max_{Q \geq 0} \sum_n U_n(q_n), \quad (3)$$

$$\text{s.t., } HQ \leq C;$$

$$Q = \{q_n\} \text{ and } C = \{c_j\},$$

In an embodiment Karush-Kuhn-Tuker (KKT) condition is used on the global optimal equation (3) to determine a constraint global maxima point $Q=\{q_n\}$ and $p=\{p_j\}$ which may further be represented as $$\nabla \sum_n U_n(q_n) - \sum_j p_j \nabla(HQ) = 0;\ \forall\ p_j > 0. \quad (4)$$

Referring to equation (4) since the utility function is concave and increasing, KKT conditions are necessary and sufficient for global maximum. Further in equation (4) the Lagrangian multiplier ($p_j$) is the cost. Further using KKT, global optimality may further be expressed as:

$$\mathcal{L}_N(Q, p) = \sum_n U_n(q_n) - \sum_j p_j \left( \sum_n (q_n) H_{nj} - c_j \right). \quad (5)$$

Maximization of global optimality is further separated over $q_n$ as:

$$\max \mathcal{L}_1(Q, p) = \sum_n U_n(q_n) - \sum_j p_j \sum_n q_n H_{nj}, \quad (6)$$

$$= \sum_n \left[ U_n(q_n) - q_n \sum_j p_j H_{nj} \right],$$

and $$\max \mathcal{L}_2(p) = \sum_j p_j c_j. \quad (7)$$

Further equation (6) is the sum of all individual optimization problems and equation (7) is the maximum profit which the neighboring nodes can achieve. Further cost for sharing by node n to node j is equivalent to the profit obtained by node j from the node n. Since both equation (6) and equation (7) are connected with the common variable $p_j$ optimal computation of $p_j$ leads to global optimization. Therefore each node n can select a neighbor with which it can share its contents $q_n$ as a solution to equation (5). The optimization of equation (6) and equation (7) provides an optimal solution for equation (3).

In another embodiment of the subject matter disclosed herein cost or Lagrangian parameter $p_j$ may be defined in various ways including packet drop probability or bandwidth charging in network congestion, Bit Error Rate (BER) in wireless networks and battery availability in sensor networks, etc. Even though the definition of cost is different for different scenarios, cost should be updated in the negative direction to the gradient of the Lagrangian formulation equation (5).

In one embodiment the $p_j$ may be defined as a function of importance of the data cached at a router and the cache filling rate as illustrated in equation 8.

$$p_j(t+1) = \left[ \gamma_1 \frac{CM_{avg_j}(t)}{c_j} + \gamma_2 \left( c_j + \frac{\delta c_j(t) + \sum_n q_n(t) H_{nj} - c_j}{\delta c_j(t) + \sum_n q_n(t) H_{nj}} \right) \right]^+ \quad (8)$$

Referring to equation (8) $\gamma_1$, $\gamma_2 \geq 0$ are the constants, $[\gamma]^+ = \max\ [y_1, 0]$, $\delta c_j$ (t) is the amount of shared cache already filled at time t and $0 < (\delta c_j(t) + \Sigma_n qn(t) Hnj) \leq c_j$. Further $CM_{avg\ j}$ is the average of the content metrics values of the cached contents at router/node j. Cost gets updated in the opposite direction to the gradient of the Langrangian Dual and cost increases with $CM_{avg\ j}$ this ensures that high demand data is being stored in node/router j. Further cost also increases with decrease in available shared cache size.

In another embodiment of the subject matter disclosed herein for every new arrival (whether from source or from neighbor) UC algorithm may be used to compute fresh CM values based on the following equation (9):

$$CM(k) = \left( \frac{c_d D(k)}{D_{max}} + \frac{c_f F(k)}{F_{max}} + c_r R + c_p P(k) \right) \quad (9)$$

The following paragraphs contain examples and experimental data provided solely for the purpose of explaining the invention disclosed in the present application and in no way may be construed as limiting the scope of application of the proposed invention.

Figure 4:
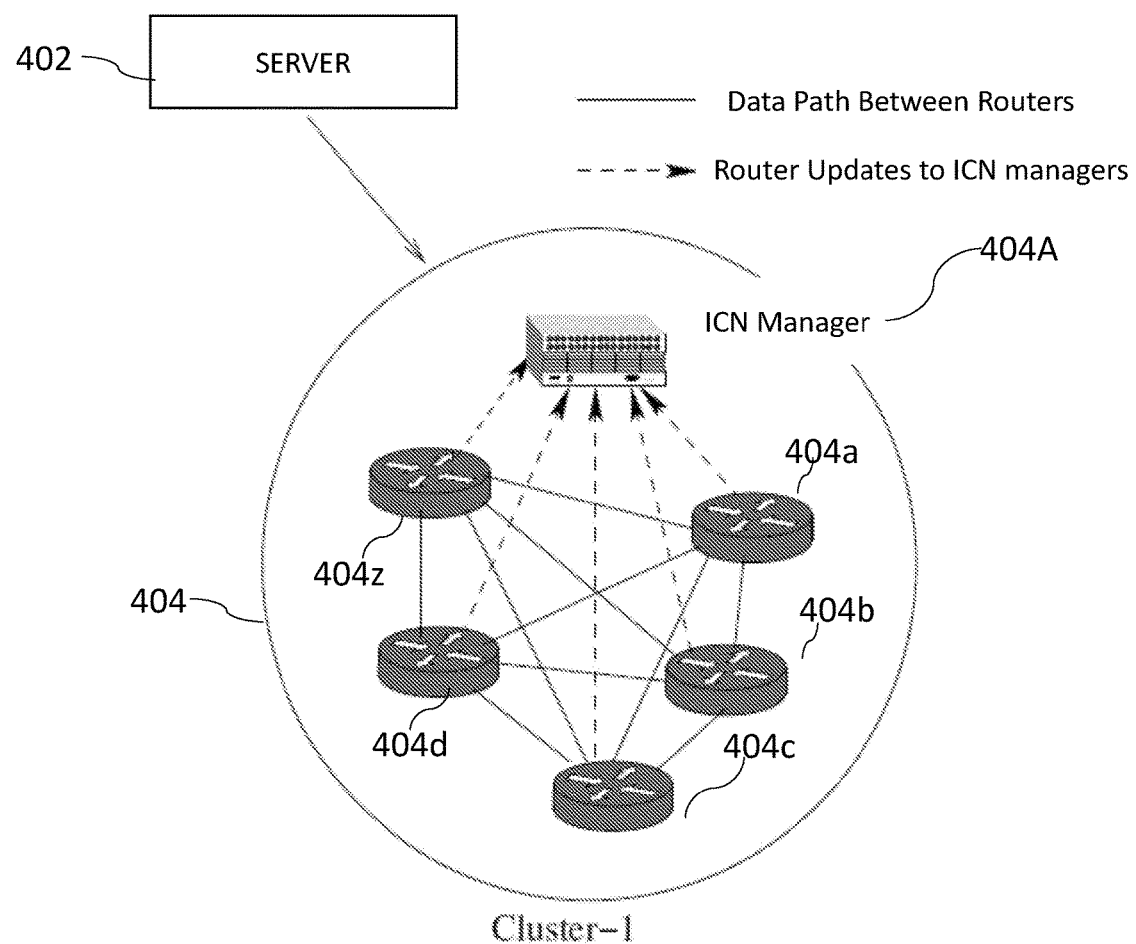
FIG. 4 illustrates a cluster for implementing Distributed Network Caching in O-ICN architecture in accordance with an exemplary embodiment of the present disclosure.

Since it is difficult to run the proposed method in the complete Internet due to present technological constrains, the network may be divided into small clusters where each cluster can be a city wide network or an administrative domain of an Internet Service Provider (SP), of an Autonomous System. One such cluster is illustrated in FIG. 4. The cluster may contain non-ICN routers as well, however for simplicity they are not shown in this figure. Each cluster may contain one or more ICN Managers or resolver. The ICN Manager in a cluster ensures that only single copy of any particular content is stored. We run the proposed optimization scheme in each cluster independently. The optimized caching is performed as per the method of FIG. 2.

In an experimental setting a discrete event network simulator model is developed using MATLAB. In the model, a cluster consisting of one ICN manager and multiple ICN routers as shown in FIG. 1 is considered where every ICN router in the cluster is connected to each other directly (single hop), Users from different routers have different types of content interests with some minimal percentage of Similar Interests (SI), a measure of the similarity among the requests arriving at the routers. Every router in the network encounters different request rates ranging from 1000-5000 requests per second for the contents. Request arrivals are modelled as a Poisson process for both new as well as existing contents in the cache. A cache refresh interval of 10 seconds is assumed, during which if the content is not accessed then it gets evicted from the cache.

The following two types of scenarios are simulated on the above mentioned experimental setting: Scenario-1 deals with non-shared cache routers in which each ICN router allocates the entire cache for its own local interests storing and manages its cache following the Universal Caching (UC) algorithm, i.e., out of all the contents, only higher content metric contents will be stored in the cache. For any new request, the router first searches in its local cache for the requested content and if the content is not available it forwards the request to the local ICN manager. The local ICN manager checks if the particular content is available in the neighboring routers' cache. If the content is still not found, it forwards the request to other ICN managers. Hence, in case of a cache miss (in local and neighboring routers), the content has to be fetched from a distant source which impacts the network performance.

In Scenario 2 a shared-cache is simulated where each ICN router shares a portion of its cache for storing other routers' contents. The shared cache percentage varies for different simulation setups. Shared cache can store the contents who have higher content metric value and which otherwise could have not been cached as in the case of non-shared scenario.

The performance metric for comparison of scenario 1 and scenario 2 are: 1) Average network cache hit, 2) average content metric content metric of cached contents and 3) average hops require per request.

Figure 5:
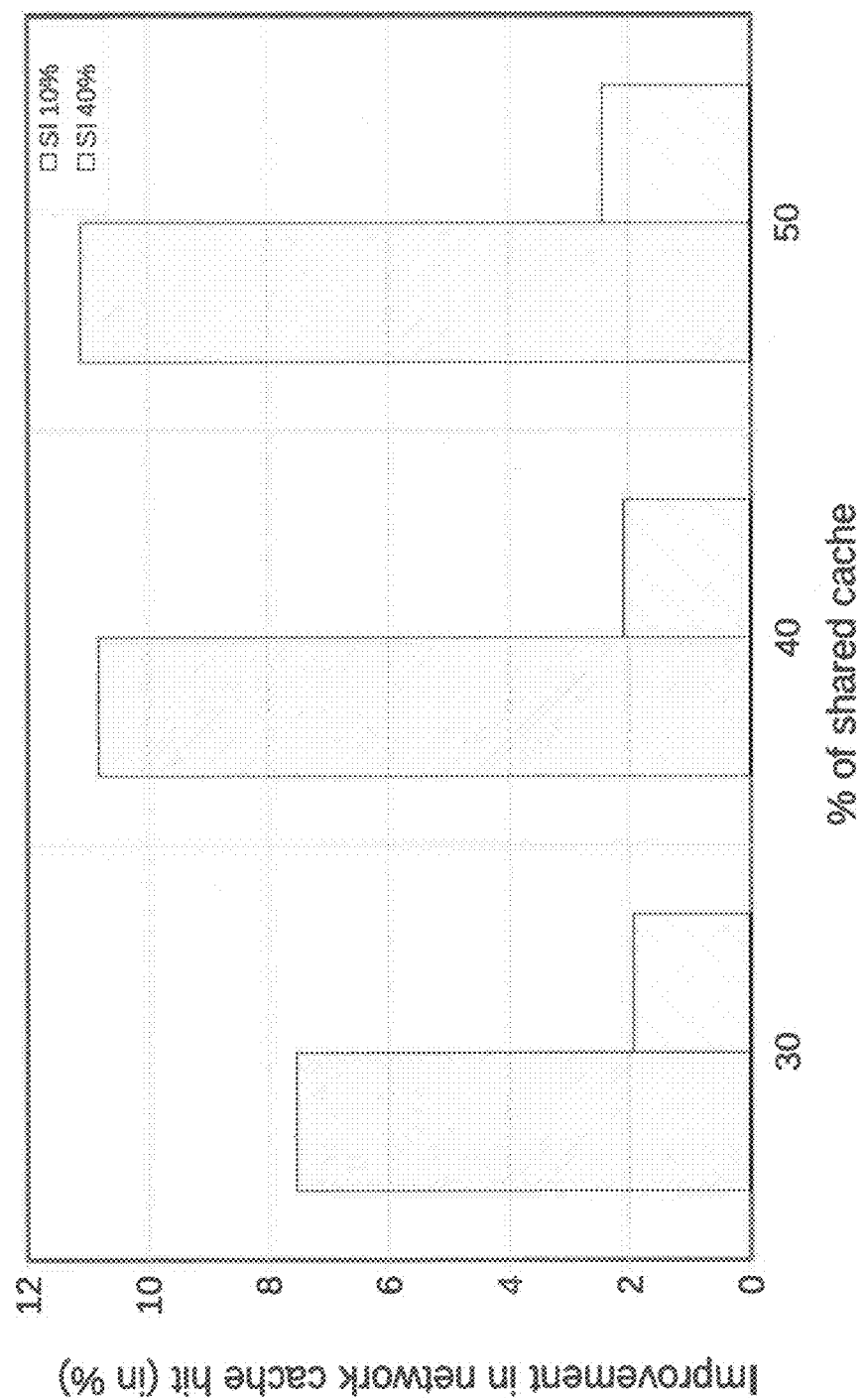
FIG. 5 illustrates a graphical representation for Percentage improvement in network cache hit of shared caching over non-shared caching for a network topology with 3 ICN routers in accordance with an exemplary embodiment of the present disclosure

The percentage improvement in network cache hit of shared UC algorithm over non-shared UC algorithm is illustrated in Figure. 5 for three different local and shared allocation ratio of router's cache. We observe that shared caching improves network cache hit around 7% to 11% for requests with Similar Interests (SI) of 10% and about 2% to 3% for SI of 40%.

Figure 6:
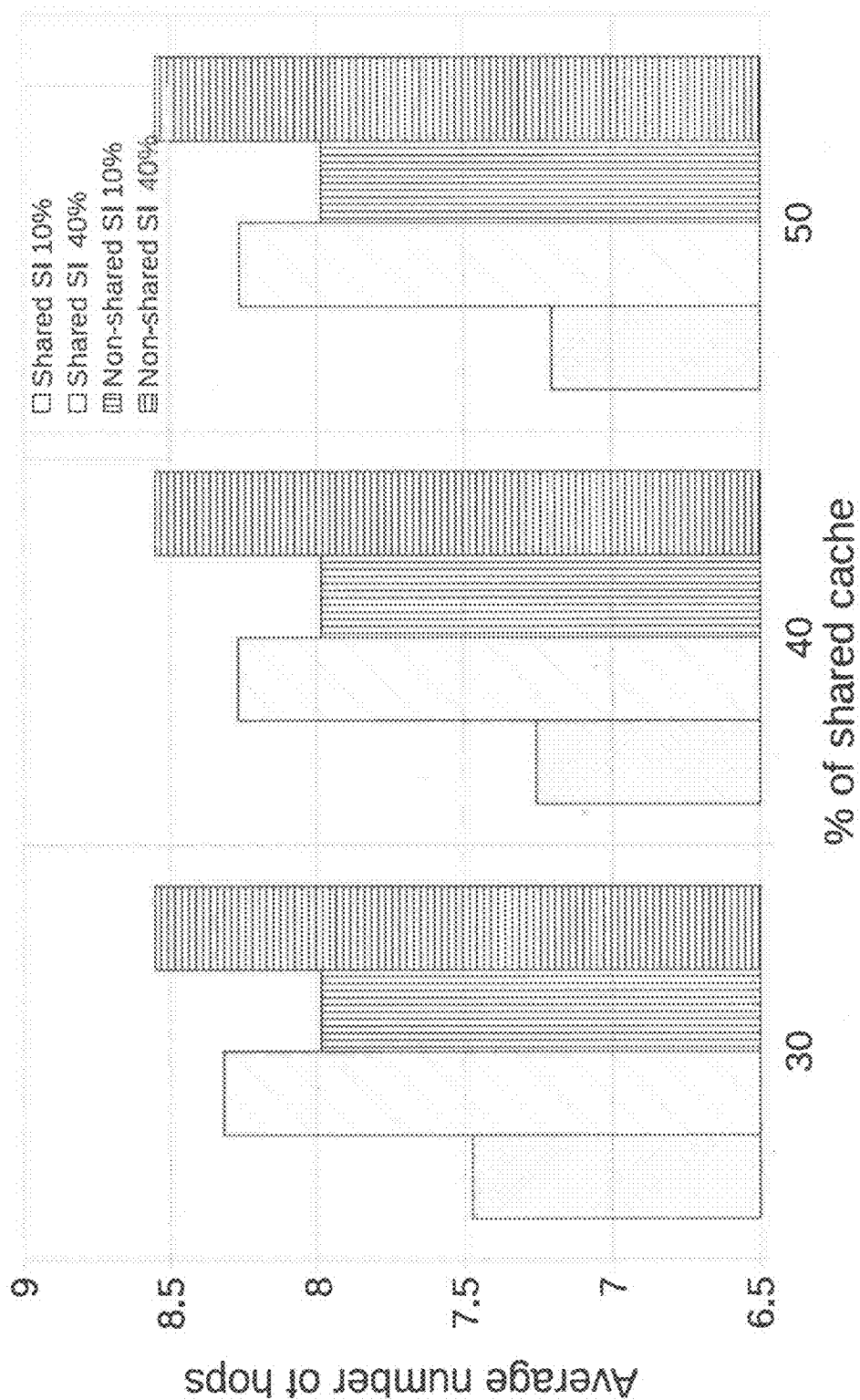
FIG. 6 illustrates a graphical representation for Average number of hops per user request for a network topology with 3 ICN routers in accordance with an exemplary embodiment of the disclosed subject matter

The increased network cache hit in shared cache mechanism is a result of higher CM contents from all routers getting cached in router's shared cache. Similarly, the average number of hops is also minimized for shared caching in comparison with non-shared caching as shown in FIG. 6. From the above results, it is inferred that, with the increase in the percentage of shared cache, both the network cache hit and the number of hops required improves. In other words, with less network sharing, contents with higher importance (from the network prospective) gets lesser opportunity to be cached resulting in the reduction of the network performance.

Figure 7:
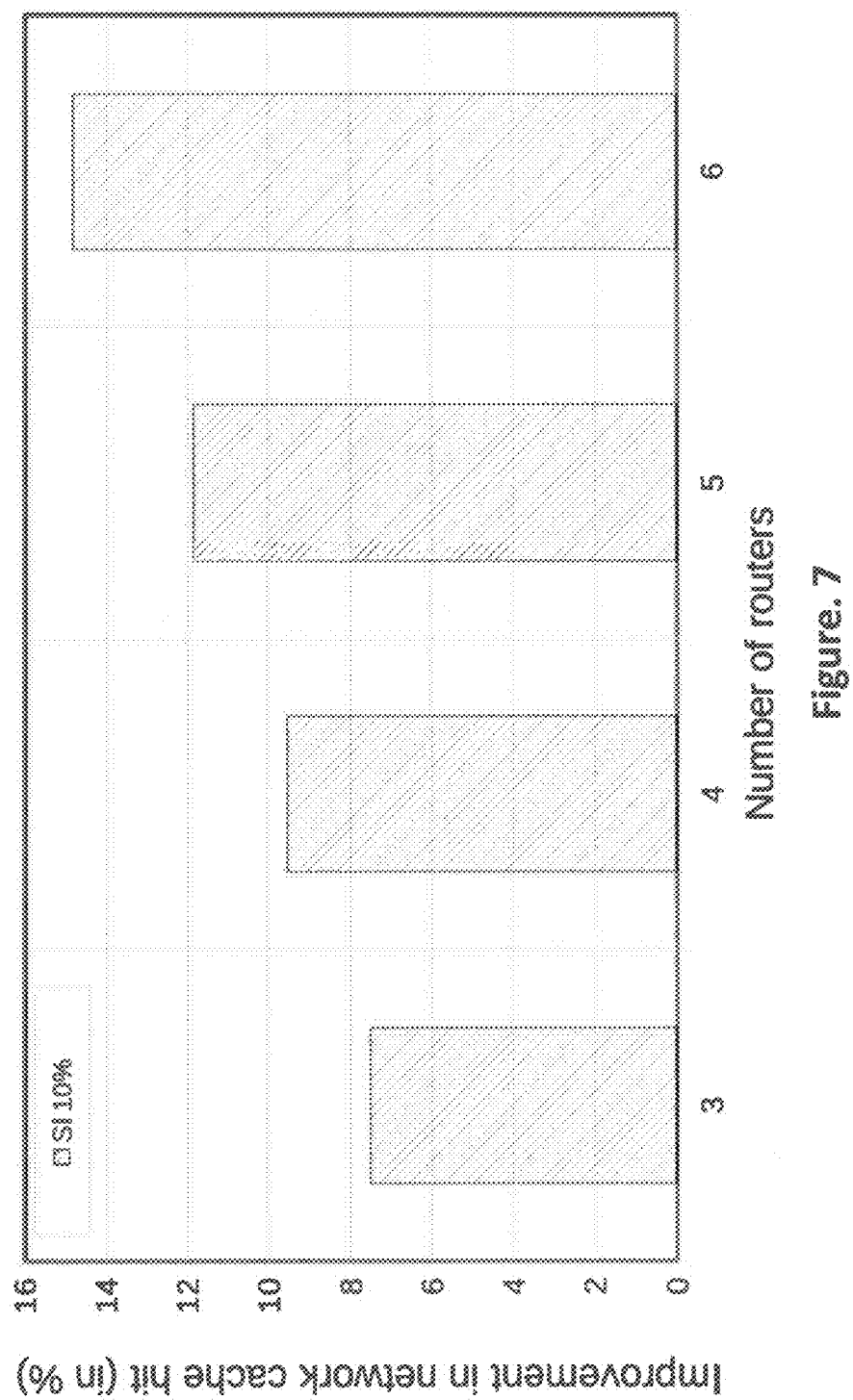
FIG. 7 illustrates a graphical representation of percentage improvement in network cache hit of shared caching over non-shared caching for a network topology with 10% SI. in accordance with an exemplary embodiment of the disclosed subject matter.
Figure 8:
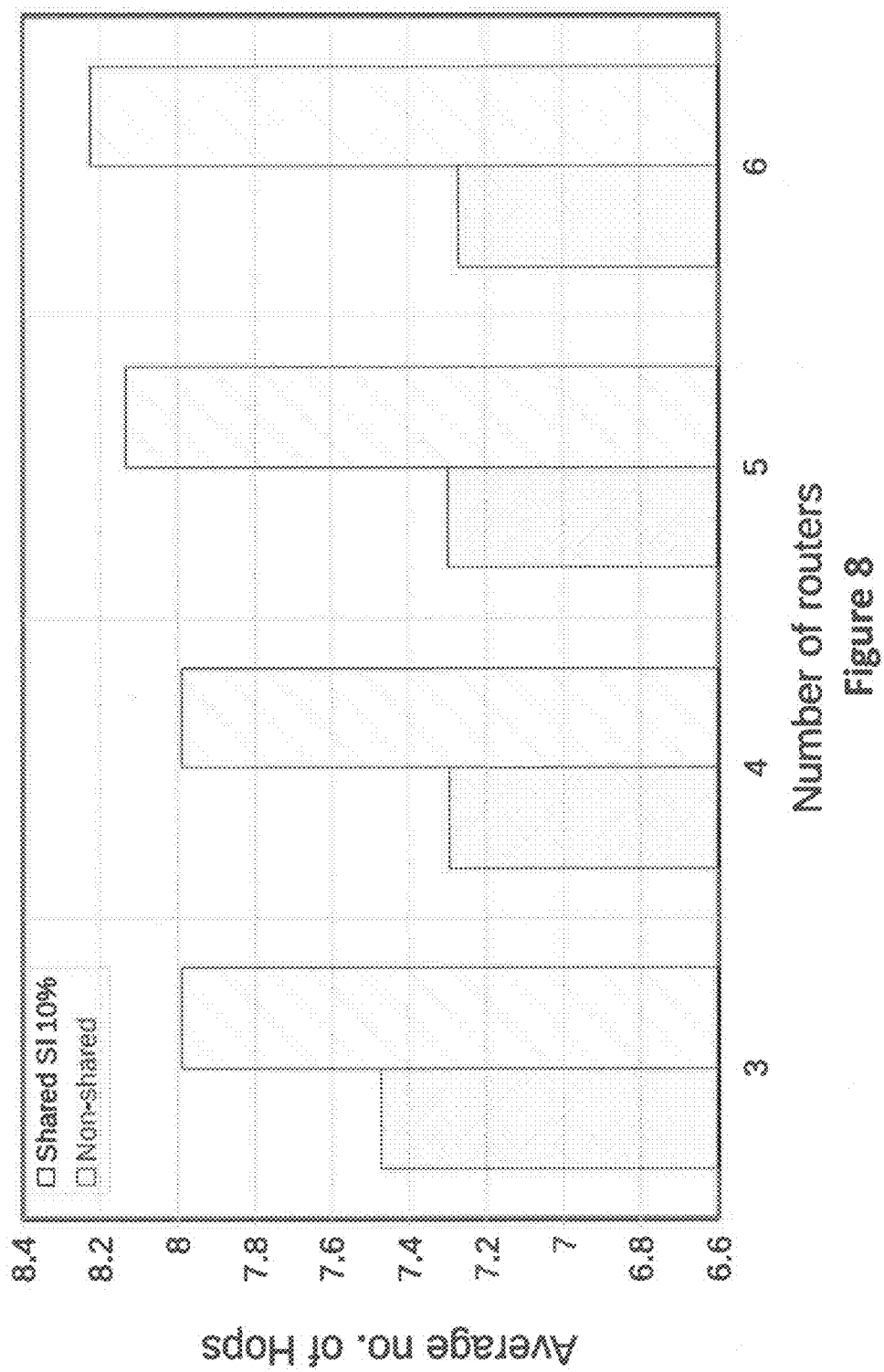
FIG. 8 illustrates a graphical representation of average number of hops per user request for a network topology with SI=10%. in accordance with an exemplary embodiment of the disclosed subject matter.

In another experimental setting the performance of shared caching scheme by introducing more routers in a network are studied. In said experimental setting 70% of the cache is reserved for the local cache (self use) while rest of the cache is shared. The SI of a network is assumed to be 10%. Initially the network has three routers with request rates 1000, 1000 and 5000 requests per second respectively. New routers are added to the network with request rates of 800 requests per second. As illustrated by in FIG. 7, the percentage improvement in network cache hit of shared caching over non-shared caching increases with the increase in number routers. This is because the contents from the higher rate routers start filling into the shared cache of all other newly added routers. Also reduction in the average number of hops required is observed per user interest as illustrated by FIG. 8.

Figure 9:
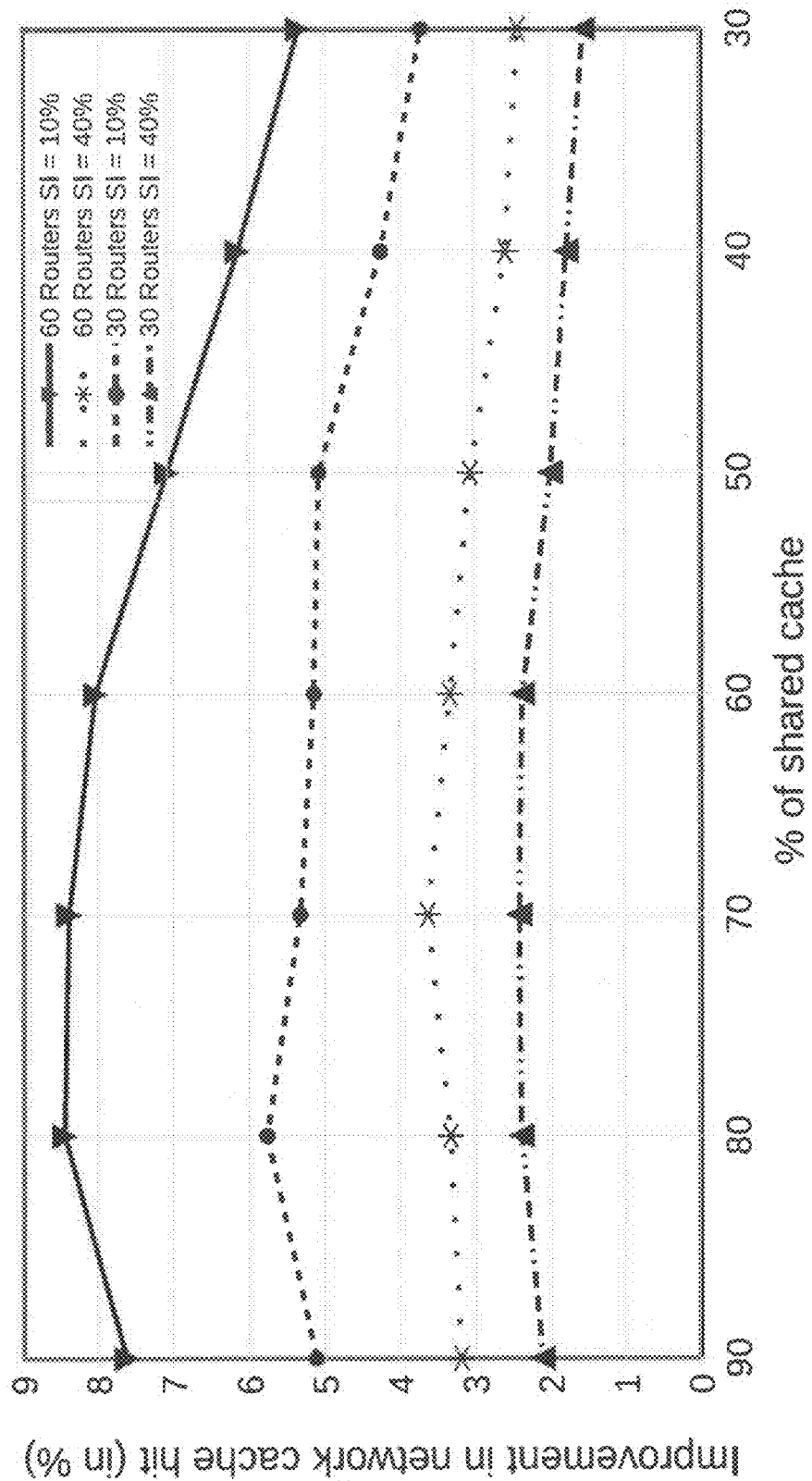
FIG. 9 illustrates a graphical representation of percentage improvement in network cache hit of shared caching over non-shared caching for a network topology with 60 ICN routers, in accordance with an exemplary embodiment of the disclosed subject matter.

In another experimental setting the performance of shared caching over non-shared caching in a larger network i.e., with more than 30 routers in the network is evaluated. All other network parameters such as request arrival rate, cache size etc, are kept same as that of previous network. The percentage improvement in network cache hit of shared caching over non-shared caching is illustrated by FIG. 9 for a network topology with 30 routers and 60 routers. As shown in FIG. 9, for a network with SI of 10%, the improvement in network cache hit is in the range of 5%-9%. When the SI of network increases to 40%, the improvement in network cache hit drops in the range of 2%-4%.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein, Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or hems, or meant to be limited to only the listed hem or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored, Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for distributed optimal caching of data in a network architecture; said method comprising:
receiving data from a source at a first router, wherein a caching policy is implemented on the first router;
computing a first characterizing metrics (CM) value for the received data using the caching policy, wherein the first CM value is used to determine whether the data can be stored in the cache of the first router;
storing the received data in a cache of the first router when first CM value is higher than a CM value of a previously cached data stored in the cache of the first router;
storing the received data in the cache of a neighbor router when the first CM value is less than a CM value of previously cached data stored in the cache of the first router, wherein storing the received data in the cache of the neighbor router comprises
selecting from a plurality of neighbor routers, the neighbor router with a least transaction cost,
computing a second CM value for the received data to be stored at the neighbor router using the caching policy, wherein the second CM value is used to determine whether the data can be stored at the neighbor router, and
storing the received data at the cache of the neighbor router when the second CM value is greater than a CM value of the data previously stored in the cache of the neighbor router,
wherein the transaction cost is determined such that the first router shares $q_n$ data with the neighbor router, the cost to the first router of sharing associated with the neighbor router is a value $p_j$ such that the total cost of sharing $q_n$ data is $(p_j \times q_n)$, wherein $p_j$ is a function of importance of the data cached at a router and the cache filling rate.

2. The method according to claim 1, further comprising providing by the neighbor router, a shareable cache to store the received data wherein the shareable cache is a predetermined portion of the total cache of the neighbor router.

3. The method according to claim 1 wherein the method is used for a plurality of caching problems including Web Caching and mobile ad hoc network (MANET).

4. The method according to claim 1, wherein the caching policy is Universal Caching (UC) policy and the network architecture is information centric networking (ICN) architecture and wherein a cache list of an ICN manager is updated by the either first router or the neighbor router when the data is stored in the cache of the first router or the neighbor router respectively.

5. The method according to claim 1 further comprising updating the value of $p_j$ and the transaction cost when the received data is stored in the cache of the neighbor router, wherein the value of $p_j$ is updated based on the received data being stored in the cache of the neighbor router.

6. The method according to claim 1 further comprising iteratively performing the steps of claim 1 based on a predetermined parameter wherein the predetermined parameter is defined by a user.

7. A system for optimal caching of data in a Network architecture; said system comprising at least one source and a plurality of clusters wherein the plurality of clusters comprise a plurality of caching devices communicatively coupled with each other, wherein the plurality of caching devices are a plurality of routers configured to perform operations comprising:
receiving data from a source at a first router of the plurality of routers, wherein a caching policy is implemented on the first router;
computing a first Characterizing metrics (CM) value for the received data using the caching policy, wherein the first CM value is used to determine whether the data can be stored in the cache of the first router;
storing the data in a cache of the first router when first CM value of the data is higher than a CM value of a previously cached data stored in the cache of the first router;
storing the data in the cache of a neighbor router when the first CM value is less than a CM value of previously cached data stored in the cache of the first router, wherein storing the data in the cache of the neighbor router comprises
selecting from a plurality of neighbor routers, the neighbor router with a least transaction cost,
computing a second CM value for the data to be stored at the neighbor router using the caching policy, wherein the second CM value is used to determine whether the data can be stored at the neighbor router, and
storing the data at the cache of the neighbor router when the second CM value is greater than a CM value of the data previously stored in the cache of the neighbor router,
wherein the transaction cost is determined such that the first router shares $q_n$ data with the neighbor router, the cost to the first router of sharing associated with the neighbor router is a value $p_j$ such that the total cost of sharing $q_n$ data is $(p_j \times q_n)$, wherein $p_j$ is a function of importance of the data cached at a router and the cache filling rate.

8. The system according to claim 7, wherein the neighbor router is further configured to provide a shareable cache to store the received data, wherein the shareable cache is a predetermined portion of the total cache of the neighbor router.

9. The system according to claim 7, wherein the caching policy is a Universal Caching (UC) policy and the network architecture is an information centric networking (ICN) architecture and wherein a cache list of an ICN manager is updated by the first router or the neighbor router when the data is stored in the cache of the first router or the neighbor router respectively.

10. The system according to claim 7, wherein the plurality of routers are further configured to update the value of $p_j$ and the transaction cost when the received data is stored in the cache of the neighbor router, wherein the value of $p_j$ is updated based on the received data being stored in the cache of the neighbor router.

11. A non-transitory computer readable medium comprising thereon instruction which when executed by a possessor on a system, cause the processor to perform a method comprising:
receiving a data from a source at a first router, wherein a caching policy is implemented on the first router;
computing a first characterizing metrics (CM) value for the received data using the caching policy, wherein the first CM value is used to determine whether the data can be stored in the cache of the first router;

storing the received data in a cache of the first router when first CM value is higher than a CM value of a previously cached data stored in the cache of the first router;

storing the received data in the cache of a neighbor router when the first CM value is less than a CM value of previously cached data stored in the cache of the first router, wherein storing the received data in the cache of the neighbor router comprises selecting from a plurality of neighbor routers, the neighbor router with a least transaction cost, computing a second CM value for the received data to be stored at the neighbor router using the caching policy, wherein the second CM value is used to determine whether the data can be stored at the neighbor router, and storing the received data at the cache of the neighbor router when the second CM value is greater than a CM value of the data previously stored in the cache of the neighbor router, wherein the transaction cost is determined such that the first router shares $q_n$ data with the neighbor router, the cost to the first router of sharing associated with the neighbor router is a value $p_j$ such that the total cost of sharing $q_n$ data is ($p_j \times q_n$), wherein $p_j$ is a function of importance of the data cached at a router and the cache filling rate.

* * * * *